Aug. 21, 1923.
J. LE R. BANKS
VEHICLE
Filed Aug. 8, 1921
1,465,248
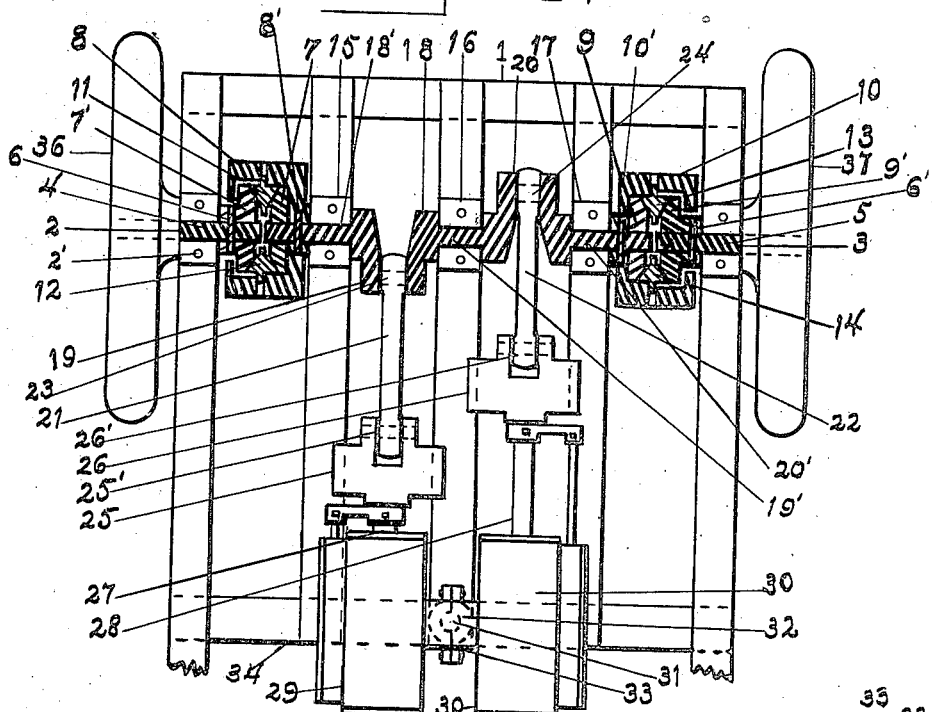
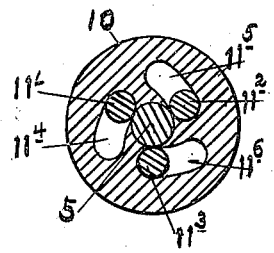
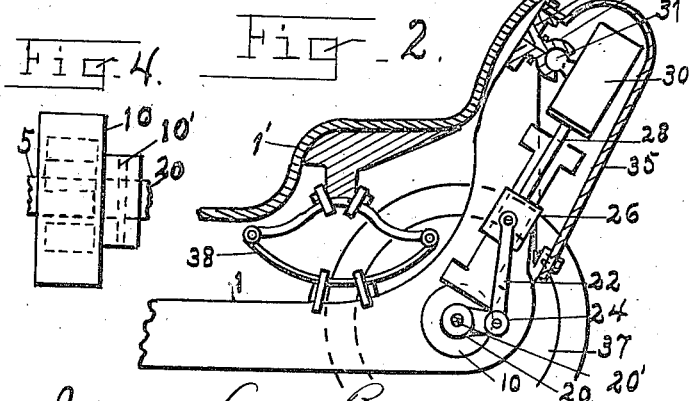

Patented Aug. 21, 1923.

1,465,248

UNITED STATES PATENT OFFICE.

JOSEPH LE ROY BANKS, OF BALTIMORE, MARYLAND.

VEHICLE.

Application filed August 8, 1921. Serial No. 490,439.

*To all whom it may concern:*

Be it known that I, JOSEPH LE ROY BANKS, a citizen of the United States, residing at 308 North Carey Street, in Baltimore city, in the State of Maryland, have invented a new and useful Improvement in Vehicles, of which the following is a specification.

My invention relates to improvements in vehicles and concerns the objects of providing a new article of manufacture; 2nd, to provide a novel direct drive for vehicles, etc.; 3rd, to provide an unbroken crank-shaft in line with the main axles secured to the wheels of a vehicle; 4th, to provide a crank-shaft forming part of an engine, whose axis of rotation is in line with the axes of the driven wheels, and having differentials, or coaster brakes arranged in the same axial line as that of the driven wheels; 5th, to provide a motor driven shaft, whose axial line is in line with the axial line of driven wheels with means for permitting the wheels to move at differing speeds when turning or rounding a curve; 6th, a power drive for vehicles arranged in the rear of the vehicle obliquely to the plane formed by the axes of the front and rear wheels, to permit both the heat and the exhaust from the engines to be dissipated as far in the rear of the vehicle as possible; 7th, to place the motor of a vehicle for driving it, as far as possible in the rear of the vehicle, beyond the driven axles of the rear wheels, so as to provide greater accessibility to the motor parts than heretofore. 8th, to provide a motor driven shaft of a vehicle with brakes similar to the coaster brakes of bicycles, for replacing differentials and to permit coasting of the vehicle. 10th, to provide a vehicle with a chassis or chassis frame with brackets or extensions at the rear and beyond and extending above the rear bearings for the axles of the rear wheels. 11th, to provide a vehicle with a chassis frame having means for supporting a motor at the rear and above the rear bearings for the axles of the rear wheels, and a hood secured by suitable means to said chassis frame. This hood may be the usual type of hinged hoods used in common automobile practice by automobile manufacturers.

I attain these objects by the arrangement of the parts of well known devices indicated and partially illustrated in the accompanying drawings in which;

Fig. 1 is a plan view of a part of the chassis frame showing the driving gear in position.

Fig. 2 is a modified side elevation of the obliquely swung engine, showing the chassis frame having means, beyond and above the rear bearings for the axles of the rear wheels, for supporting the engine or motor and the hood.

Fig. 3 is a section of a modified differentiating device or a modified coaster brake for permitting the differentiation of the wheels of my vehicle when rounding curves in the roadbed.

Referring to the drawings, the numeral 1 designates the chassis frame of a vehicle with the usual bearings, provided with either ball, roller or plain bushings, 2 and 3 held to the chassis frame 1 by the bolts 2', in which bearings are journalled the axles 4 and 5 respectively operating to rotate the wheels 36 and 37 respectively; and to these axles are secured the bevel gears 7' by the pin 6 to axle 4, and 9' secured to its axle 5 by its pin 6' by which the pinions 11—12, and 13—14 respectively are rotated when the wheels are moving at a different rate of speed from the crankshaft when the vehicle is rounding a curve.

The exterially arranged co-axial gears 7 and 9, while in line with the axes of rotation of both the crankshaft 18 and the driven wheels 36 and 37, are free to rotate around the crankshaft but are frictionally held in their respective casing collars 8 and 10 secured to the opposite ends 18' and 20' of the crankshaft 18 by the pins 8' and 10', so that the friction of the casing collars will equal approximately that of the road traction when going in a straight line; the friction upon the bevel gears 7—9 in the casing collars will thus prevent the small pinions from turning except when the road traction is increased at the wheels when rounding a curve, then the pinions will revolve sufficiently to permit the wheels to accommodate themselves to the varying speeds of the different wheels required to round curves.

But I may use the hubs of the wheels for rotating them in lieu of the axles, similar to the arrangement of automobiles having hubs secured to sleeves over stationary axles, or may connect the hubs of the wheels direct to differentiating devices.

Inside of the casing collars 8 and 10 and spanning the space between the axles of the wheels and the crankshaft, are pivoted the pinions 11—12 and 13—14 respectively and move with the casing collars and the crankshaft and the axles when the vehicle is in motion.

The crankshaft 18 is supported by the bearings 15—16—17, in which are journalled the three supporting bearing pins 18'—19'—20'— or main shaft of the crankshaft 18 provided with the cranks 19—20, said crankshaft 18 being secured in the usual way by the pins 8'—10' to the casing collars 8—10 inclosing the differential gears 7—7'—9—9' and the pinions 11—12—13—14 meshing with the bevel gears 7—7'—9—9' and whereby they are locked when the vehicle is going in a straight line.

In the connecting rods 21 and 22 are journalled the crank pins 23 and 24 respectively, forming the usual construction of an engine in common practice.

The features of my invention being concerned with the driving means, it is not thought necessary to describe the engine or motor more fully than to say that the crossheads 25 and 26 connected by the connecting rods 21—22 respectively, are operated by the piston rods 27—28 respectively operated in turn by their cylinders 29—30 braced by the yoke 33 supported by the ball 31 held by its complement socket 32 forming part of or attached to the bracket 34 secured to the chassis frame 1 of the vehicle.

The operation of my principle being self-evident from the drawings, it is not thought necessary to detail its operation; but I do not care to limit myself to any particular construction of engine or motor to operate or drive my crankshaft; nor do I care to limit the position of the engine to any angle in its fixed position on the vehicle.

In Figure 2 the engine or motor 30 is shown obliquely suspended at the rear of the chassis frame, thereby making its accessibility more advantageous in reaching its parts to ascertain whether its working parts are in good condition; and for exhibiting the working parts in a completed vehicle; as well as to ascertain what parts are required to make repairs; also to assist in dissipating the heat from the engine away from the occupants of the vehicle when it is in motion.

The parts and pipes to the engine are not shown, nor the power plant for operating the engine or the motor; it being common practice to provide power plants for motors of vehicles.

In Figure 3, $11'$,—$11^2$,—$11^3$ are rollers incased in the casing collar 10 and are free to revolve or roll in their cam-shaped sockets $11^4$,—$11^5$,—$11^6$ respectively, except when the said rollers are gripping the axle 5 as the said casing collar revolves towards the left with the motion of the engine crankshaft, releasing the axle when the axle and its wheel exceed the engine speed as when rounding curves.

35 shows a housing or cover for the engines. 1' shows the body of a car supported by the spring 38 attached to and above the chassis frame 1 of the vehicle.

In using an electric motor to substitute the engine shown, the rotating parts of the motor would be substituted in place of the crankshaft.

I claim:

1. In a vehicle, a power drive comprising a shaft divided into three sections, the outer sections of which are suitably secured to propelling wheels at one end and at the other end to a gear, a series of bevel pinions spanning the space between the outer sections and the inner section and meshing with a gear free to rotate around the shaft but frictionally held in a collar casing secured to the inner section and inclosing the said gears and pinions, and means for rotating the inner section of the shaft.

2. In a vehicle, a power drive comprising a shaft divided into sections the outer sections adapted to rotate the propelling wheels and the inner section, provided with a power means and forming part of the said power means, having collars at both ends inclosing means for differentially operating the outer sections, and means for supplying power to the power means.

3. In a vehicle, a power drive comprising a shaft divided into sections the outer sections of which are adapted to rotate propelling wheels and the inner section forming part of the driving means and having at each end a casing collar inclosing means for spanning the outer and inner section ends to differentially rotate the outer sections, and means for supplying power to the inner section.

4. In a vehicle, a chassis frame provided with an extension above the chassis frame towards the rear of the vehicle, bearings in the frame for the rear axles of the rear wheels, a joint secured to the said extension, a power supplying means secured to said joint, a rear axle divided into sections and secured to propelling wheels and driven by the power means, and means for permitting the differentiating of the rear propelling wheels.

5. In a vehicle, a chassis frame having an angular extension at the rear of the vehicle beyond the rear axle and above the wheel base for supporting the power means.

6. In a vehicle, a chassis frame having an angular extension at the rear of the vehicle beyond the rear axle and above the wheel base, a power means secured to said extension, and a hood over the power means.

7. In a vehicle, a chassis frame provided with an extension above the said frame, one member of a movable joint secured to the said extension and the other member of the said movable joint secured to a power means said power means being adapted to propel the said vehicle.

8. In a vehicle, a chassis frame provided with an extension above the said frame, one member of a universal joint secured to the said extension, and the other member of the universal joint being secured to a power means adapted to propel the vehicle, with means for securing the parts of the said universal joint together.

JOSEPH LE ROY BANKS.